United States Patent Office 3,458,638
Patented July 29, 1969

3,458,638
FUNGICIDAL COMPOSITION CONTAINING ZINC DITHIOCARBAZATE
Ryozo Hatta, Kyoto, Jiro Kinugawa, Osaka, Hiroichi Yamamoto, Kobe, Ikuo Sumina, Kyoto, Bunzo Tamura, Nishinomiya, and Shigekazu Suzuki, Osaka, Japan, assignors to Takeda Pharmaceutical Industries, Ltd., Osaka, Japan
No Drawing. Filed May 9, 1960, Ser. No. 27,537
Claims priority, application Japan, May 9, 1959, 34/15,036
Int. Cl. A01m 9/12; C07c 155/04
U.S. Cl. 424—289    1 Claim The present invention relates to valuable fungicidal compositions and to the use thereof, more especially in agriculture, in combating fungi and bacteria which cause, for example, anthracnose, downy mildew, black spot, late blight, leaf spot, soft rot, etc., in plants of various kinds.

The fungicidal compositions of the present invention are characterized by absence of phytotoxicity and by the fact that they contain, as ingredient of fungicidal activity, at least one compound of the formula $$(R-NH-\overset{S}{\underset{\|}{C}}-S-)_n M \qquad (I)$$

wherein R is a substituted or unsubstituted primary, secondary or tertiary amino group, M is a metal, an organometal group, or a radical which forms an ammonium, hydrazinium or organic quaternary ammonium salt, and $n$ is a whole number of at least 1.

The substituted amino group represented by R in the above formula may be a mono- or disubstituted amino group and the substituent may be an acyl, alkyl, aralkyl or aryl group, and may contain a saturated or unsaturated, cyclic or heterocyclic moiety. Radicals bonding to nitrogen through two bonds are also included in the range of R, i.e. the compounds may form so-called Schiff's bases. As mentioned before, M in the formula represents a group capable of forming an ammonium, hydrazinium or organic quaternary ammonium salt, or a metal such as sodium, potassium, iron, nickel, manganese, zinc, lead and copper, or an organometal group such as the phenylmercuric, methylarsinic and benzylarsinic groups.

The compounds I, thus employed as active ingredients in the fungicidal compounds of the present invention, can conveniently be prepared as follows:

To a solution of hydrazine in an organic solvent such as alcohol is added dropwise carbon disulfide in the presence of a base such as alkali metal hydroxide, ammonia, hydrazine or an organic amine, whereupon the corresponding salt of dithiocarbazic acid is produced. If necessary, the salt is dissolved in water and an aqueous solution of a metal salt is added, when the corresponding metal salt of dithiocarbazic acid is formed. It is also possible to effect the above reactions in water, using no organic solvent. When the reaction between hydrazine and carbon disulfide is carried out in a suspension of zinc hydroxide in water, the zinc salt of dithiocarbazic acid is produced in one step. In order to prepare a dithiocarbazic acid derivative in which R in the general formula represents a radical bonding to a nitrogen through two bonds, i.e. when the derivatives are so-called Schiff's bases of a compound whose R is amino group, the corresponding aldehyde or ketone is added to a suspension of a salt such as sodium, potassium or ammonium salt of dithiocarbazic acid in alcohol. If necessary, the resulting salt can be converted to various other salts.

The following Table 1 lists a wide variety of compounds useful as active fungicidal component(s) in the compositions of this invention:

TABLE 1

| No. | Compound | Appearance | M.P., °C. | R | n | M |
|---|---|---|---|---|---|---|
| 1 | Manganese dithiocarbazate | Yellow powder | ¹328–330 | —NH₂ | 2 | Mn |
| 2 | Cupric dithiocarbazate | Dark green powder | >340 | —NH₂ | 2 | Cu |
| 3 | Zinc dithiocarbazate | White powder | >340 | —NH₂ | 2 | Zn |
| 4 | Lead dithiocarbazate | Yellow powder | ¹130 | —NH₂ | 2 | Pb |
| 5 | Benzyltriethylammonium dithiocarbazate | Oily substance | | —NH₂ | 1 | 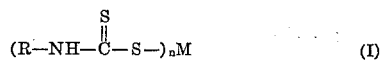 |
| 6 | Phenylmercuric dithiocarbazate | Pale yellow powder | ¹120 | —NH₂ | 1 | ⟨⟩—Hg |
| 7 | Zinc 3-acetyldithiocarbazate | White powder | >340 | CH₃CONH— | 2 | Zn |
| 8 | Triethylammonium 3-acetyl-dithiocarbazate | do | ¹86–88 | CH₃CONH— | 1 | Et₃ṄH |
| 9 | Potassium 3-propionyl-dithiocarbazate | Pale yellow powder | ¹135–136 | CH₃CH₂CONH— | 1 | K |
| 10 | Zinc 3-(p-methylbenzoyl)-dithiocarbazate | White powder | ¹164 | CH₃—⟨⟩—CONH— | 2 | Zn |
| 11 | Zinc 3-(m-methylbenzoyl)-dithiocarbazate | do | ¹176–178 | CH₃-⟨⟩—CONH— | 2 | Zn |
| 12 | Triethylammonium 3-(o-hydroxybenzoyl)-dithiocarbazate | Colorless powder | ¹110–113 | OH-⟨⟩—CONH— | 1 | Et₃ṄH |
| 13 | Potassium 3-(p-dimethylaminobenzoyl)-dithiocarbazate | Colorless needles | ¹223–228 | (CH₃)₂N—⟨⟩—CONH— | 1 | K |

TABLE 1—Continued

| No. | Compound | Appearance | M.P., °C. | R | n | M |
|---|---|---|---|---|---|---|
| 14 | Zinc 3-benzoyldithiocarbazate | White powder | [1] 210–212 | C₆H₅–CONH– | 2 | Zn |
| 15 | Triethylammonium 3-(p-chlorobenzoyl)-dithiocarbazate | ___do___ | [1] 107–108 | Cl–C₆H₄–CONH– | 1 | Et₃ṄH |
| 16 | Potassium 3-(2-furoyl)-dithiocarbazate | ___do___ | [1] 238–239 | (2-furyl)–CONH– | 1 | K |
| 17 | Zinc 3-(2-furoyl)-dithiocarbazate | ___do___ | [1] 190–220 | (2-furyl)–CONH– | 2 | Zn |
| 18 | Triethylammonium 3-(2-furoyl)dithiocarbazate | ___do___ | [1] 92–98 | (2-furyl)–CONH– | 1 | Et₃ṄH |
| 19 | Zinc 3-nicotinoyl-dithiocarbazate | Yellow powder | [1] 174–176 | (3-pyridyl)–CONH– | 2 | Zn |
| 20 | Potassium 3-ethylidenedithiocarbazate | Colorless needles | [1] 200 | CH₃CH=N– | 1 | K |
| 21 | Zinc 3-ethylidenedithiocarbazate | White powder | >300 | CH₃CH=N– | 2 | Zn |
| 22 | Potassium 3-isopropylidenedithiocarbazate | Colorless needles | [1] 120 | (CH₃)₂C=N– | 1 | K |
| 23 | Nickel 3-isopropylidenedithiocarbazate | Yellowish green powder | [1] 200 | (CH₃)₂C=N– | 2 | Ni |
| 24 | Potassium 3-benzylidenedithiocarbazate | Pale yellow needles | >300 | C₆H₅–CH=N– | 1 | K |
| 25 | Zinc 3-benzylidenedithiocarbazate | Pale yellow powder | >300 | C₆H₅–CH=N– | 2 | Zn |
| 26 | Potassium 3-(o-hydroxybenzylidene)-dithiocarbazate | Pale yellow needles | >300 | o-HO-C₆H₄–CH=N– | 1 | K |
| 27 | Triethylammonium 3-(o-hydroxybenzylidene)-dithiocarbazate | Yellow plates | [1] 130 | o-HO-C₆H₄–CH=N– | 1 | HṄEt₃ |
| 28 | Zinc 3-(o-hydroxybenzylidene)dithiocarbazate | Pale yellow powder | >300 | o-HO-C₆H₄–CH=N– | 2 | Zn |
| 29 | Potassium 3-(2-furfurylidene) dithiocarbazate | Yellow needles | [1] 193–196 | (2-furyl)–CH=N– | 1 | K |
| 30 | Manganese 3-(2-furfurylidene) dithiocarbazate | Yellowish brown powder | [1] 198 | (2-furyl)–CH=N– | 2 | Mn |
| 31 | Ferrous 3-(2-furfurylidene) dithiocarbazate | Blackish brown powder | [1] 184 | (2-furyl)–CH=N– | 2 | Fe |
| 32 | Ferric 3-(2-furfurylidene) dithiocarbazate | ___do___ | [1] 188 | (2-furyl)–CH=N– | 3 | Fe |
| 33 | Cobaltous 3-(2-furfurylidene) dithiocarbazate | ___do___ | [1] 262 | (2-furyl)–CH=N– | 2 | Co |
| 34 | Nickel 3-(2-furfurylidene) dithiocarbazate | Purplish brown powder | [1] 201 | (2-furyl)–CH=N– | 2 | Ni |

TABLE 1—Continued

| No. | Compound | Appearance | M.P., °C. | R | n | M |
|---|---|---|---|---|---|---|
| 35 | Cupric 3-(2-furfurylidene) dithiocarbazate. | Blackish brown powder. | ¹179 | furfurylidene-CH=N— | 2 | Cu |
| 36 | Zinc 3-(2-furfurylidene) dithiocarbazate. | Pale yellow powder | ¹200 | furfurylidene-CH=N— | 2 | Zn |
| 37 | Cadmium 3-(2-furfurylidene) dithiocarbazate. | do | ¹150 | furfurylidene-CH=N— | 2 | Cd |
| 38 | Stannous 3-(2-furfurylidine) dithiocarbazate. | Yellow powder | ¹160 | furfurylidene-CH=N— | 2 | Sn |
| 39 | Methylarsine 3-(2-furfurylidene)-dithiocarbazate. | Pale yellow powder | ¹139 | furfurylidene-CH=N— | 2 | AsCH₃ |
| 40 | Benzylarsine 3-(2-furfurylidene)-dithiocarbazate. | Yellow powder | ¹131 | furfurylidene-CH=N— | 2 | AsCH₂—C₆H₅ |
| 41 | Phenylmercuric 3-(2-furfurylidene)-dithiocarbazate. | do | ¹120 | furfurylidene-CH=N— | 1 | Hg—C₆H₅ |
| 42 | Ferric 3-phenyldithiocarbazate. | Blackish brown | ¹104–106 | C₆H₅—NH— | 3 | Fe |
| 43 | Zinc 3-phenyldithiocarbazate | White powder | ¹141.5 | C₆H₅—NH— | 2 | Zn |
| 44 | Zinc 3-(p-tolyl)dithiocarbazate. | do | ¹124 | CH₃—C₆H₄—NH— | 2 | Zn |
| 45 | Triethylammonium 3-phenyl-dithiocarbazate. | Colorless needles | ¹107–109 | C₆H₅—NH— | 1 | Et₃NH |
| 46 | Isopropylammonium 3-phenyldithiocarbazate. | do | ¹133–135 | C₆H₅—NH— | 1 | Me₂CH.$\overset{+}{\text{NH}}_3$ |
| 47 | γ-Picolinium 3-phenyldithiocarbazate. | do | ¹95 | C₆H₅—NH— | 1 | $\overset{+}{\text{HN}}$-pyridyl-CH₃ |
| 48 | 2-methyl-5-ethylpyridinium 3-phenyldithiocarbazate. | do | ¹87–89 | C₆H₅—NH— | 1 | 2-Me-5-Et-pyridinium |
| 49 | Triethylammonium 3-(p-nitro-phenyl)-dithiocarbazate. | Brown needles | ¹141 | NO₂—C₆H₄—NH— | 1 | Et₃$\overset{+}{\text{N}}$H |
| 50 | Triethylammonium 3-pyrimidinyl-(2)-dithiocarbazate. | Colorless needles | ¹114 | pyrimidinyl—NH— | 1 | Et₃$\overset{+}{\text{N}}$H |
| 51 | Methylarsine 3-phenyldithiocarbazate. | White powder | ¹101–104 | C₆H₅—NH— | 2 | AsCH₃ |

¹ Decomposition.
Et: C₂H₅, Me: CH₃

Examples of the preparation of typical compounds of the preceding table, composing the fungicides of this invention, are shown in the following:

(i) To a suspension of 7.3 parts by weight of potassium dithiocarbazate in 50 parts by volume of methanol, 6.7 parts by weight of furfural is added. The mixture is agitated for 30 minutes at room temperature (about 20° to about 30° C.), then for ten minutes at 50° C. After cooling, 7.7 parts by weight of potassium 3-(2-furfurylidene)dithiocarbazate separates out.

(ii) To a solution of 2.2 parts by weight of potassium 3-(2-furfurylidene)dithiocarbazate in 20 parts by volume of water is added a solution of 1.1 parts by weight of zinc sulfate in 20 parts by volume of water to separate 2 parts by weight of zinc 3-(2-furfurylidene)dithiocarbazate.

(iii) In preceding example (ii), instead of zinc sulfate, there may be used salts of copper, cadmium, tin, manganese, iron, cobalt, etc. to obtain the respective salts of 3-(2-furfurylidene)dithiocarbazic acid.

(iv) To a solution of 1.0 part by weight of potassium 3-(2-furfurylidene)-dithiocarbazate in 100 parts by volume of methanol is added a solution of 1.0 part by weight of phenylmercuric acetate in 50 parts by volume of methanol to separate 1.0 part by weight of phenylmercuric 3-(2-furfurylidene)dithiocarbazate.

(v) Into a solution of 2.3 parts by weight of potassium 3-(2-furfurylidene)-dithiocarbazate in 20 parts by volume of water is stirred dropwise 0.8 part by weight of methylarsinic dichloride in 10 parts by volume of benzene to separate precipitates. To a solution of the precipitates in 25 parts by volume of ethyl acetate is added 70 parts by volume of normal hexane to obtain 0.7 part by weight of methylarsine 3-(2-furfurylidene)-dithiocarbazate.

(vi) To a suspension of 4.4 parts by weight of potassium dithiocarbazate in a mixture composed of 10 parts by volume of water and 60 parts by volume of ethanol is added dropwise 5 parts by weight of acetaldehyde for 20 minutes at 0° C. Then the mixture is agitated for 30 minutes at the same temperature. To the mixture is added 100 parts by volume of ethyl acetate to obtain 1.8 parts by weight of potassium 3-ethylidene-dithiocarbazate.

To a solution of the product in water is added an aqueous solution of zinc acetate to separate zinc 3-ethylidene-dithiocarbazate.

(vii) In a similar reaction to (vi), potassium dithiocarbazate and benzaldehyde give potassium 3-benzylidenedithiocarbazate; further the product can be converted into zinc 3-benzylidenedithiocarbazate.

(viii) In a similar reaction to (vi), potassium dithiocarbazate and o-hydroxybenzaldehyde give potassium 3-(o-hydroxybenzylidene)dithiocarbazate which can be converted to any other metallic salt thereof.

(ix) Ten parts by volume of acetone is added to a solution of 5.9 parts by weight of potassium dithiocarbazate in 7 parts by volume of water, then the mixture is agitated for 20 minutes at room temperature, and 100 additional parts by volume of acetone added to separate 4.9 parts by weight of potassium 3-isopropylidenedithiocarbazate.

To a solution of 0.93 part by weight of this product in 10 parts by volume of water is added a solution of 0.70 part by weight of nickel sulfate in 10 parts by volume of water to separate 0.81 part by weight of nickel 3-isopropylidenedithiocarbazate.

(x) To a suspension of 6.2 parts by weight of 80% hydrazine hydrate in 150 parts by volume of water is added 49 parts by weight of zinc hydroxide is added 10 parts by weight of carbon disulfide, at room temperature and while stirring. 12.7 parts by weight of zinc dithiocarbazate are obtained.

(xi) In a similar manner to (x), zinc dithiocarbazates such as zinc 3-phenyldithiocarbazate, zinc 3-p-toluyldithiocarbazate, zinc 3-acetyl-dithiocarbazate and zinc 3-benzoyl-dithiocarbazate are obtained from phenylhydrazine, p-toluylhydrazine, acetylhydrazine, benzoylhydrazine, etc., respectively.

The above examples merely represent presently preferred methods of preparing the active component of the fungicides of this invention; however, compounds I made through other methods are also applicable to the purpose of this invention. Other compounds whose preparation is not specifically exemplified above are producible in analogous manner. In the above examples, relationship between parts by weight and parts by volume is the same as that between grams and milliliters.

A further group of specific compounds useful as active component in the fungicidal compositions of this invention is set forth in the following table:

TABLE 2

| Compound | Appearance | M.P., °C. | R | n | M |
|---|---|---|---|---|---|
| 52. Potassium dithiocarbazate | Colorless needles | [1] 66-67 | —NH$_2$ | 1 | K |
| 53. Nickel dithiocarbazate | Blackish brown powder. | [1] 238-240 | —NH$_2$ | 2 | Ni |
| 54. Ammonium dithiocarbazate | White powder | [1] 110 | —NH$_2$ | 1 | $\overset{+}{N}H_4$ |
| 55. Hydrazinium dithiocarbazate | do | [1] 124 | —NH$_2$ | 1 | NH$_2\overset{+}{N}H_3$ |
| 56. Ammonium 3-phenyl-dithiocarbazate. | Colorless needles | [1] 115-118 | ⟨C$_6$H$_5$⟩—NH— | 1 | $\overset{+}{N}H_4$ |
| 57. Phenylhydrazinium 3-phenyl-dithiocarbazate. | do | [1] 93-94 | ⟨C$_6$H$_5$⟩—NH— | 1 | ⟨C$_6$H$_5$⟩—N$H\overset{+}{N}H_3$ |
| 58. Hydrazinium 3-phenyl-dithiocarbazate. | do | [1] 108-112 | ⟨C$_6$H$_5$⟩—NH— | 1 | NH$_2\overset{+}{N}H_3$ |
| 59. p-Tolylhydrazinium 3-(p-tolyl)-dithiocarbazate. | do | [1] 107 | CH$_3$—⟨C$_6$H$_4$⟩—NH— | 1 | CH$_3$—⟨C$_6$H$_4$⟩—N$H\overset{+}{N}H_3$ |

[1] Decomposition.

These compounds can be prepared after the manner precedingly described or in any other desired manner.

The antifungal activity of compound I is illustrated with reference to a typical presently-preferred representative thereof (zinc dithiocarbazate) in the following table (Table 3), which shows the minimum concentrations of zinc dithiocarbazate at which the growth of each fungus in the table is completely inhibited. These fungi were incubated for five days at 28° C. The standard agar dilution method was employed for determining the antifungal spectrum of the zinc dithiocarbazate.

Table 3

| Organism: | Minimum inhibitory concentration γ/ml. |
|---|---|
| 1. *Saccharomyces cerevisiae* | 35 |
| 2. *Saccharomyces sake* | 15 |
| 3. *Zygosaccharomyces soya* | 10 |
| 4. *Hansenula anomala* | 35 |
| 5. *Torula rubra* | 10 |
| 6. *Candida albicans* | 500 |
| 7. *Candida pseudotropicalic* | 50 |
| 8. *Candida krusei* | 50 |
| 9. *Candida parakrusei* | 50 |
| 10. *Cryptococcus neoformans* | 10 |
| 11. *Trichophyton interdigitale* | 10 |
| 12. *Trichophyton mentagrophytes* | 10 |
| 13. *Piricularia oryzae* | 50 |
| 14. *Gibberella fujikuroi* | 500 |
| 15. *Hypochnus sasakii* | 50 |
| 16. *Helminthosporium sigmoideum* | 10 |
| 17. *Ophiobolus miyabeanus* | 750 |
| 18. *Gibberella saubinetii* | 200 |
| 19. *Pyrenophora graminea* | 15 |
| 20. *Cephalosporium gramineum* | 200 |
| 21. *Ustilago zeae* | 15 |
| 22. *Phytophthora infestans* | 50 |
| 23. *Macrosporium bataticola* | 150 |
| 24. *Ceratostomella fimbriata* | 150 |
| 25. *Colletotrichum lagenarium* | 75 |
| 26. *Phomopsis vexans* | 5 |
| 27. *Rhizoctonia solani* | 10 |
| 28. *Sclerotinia sclerotiorum* | 10 |

TABLE 3.—Continued

| Organism: | Minimum inhibitory concentration γ/ml. |
|---|---|
| 29. Botrytis cinerea | 750 |
| 30. Pythium debaryanum | 500 |
| 31. Glomerella cingulata | 75 |
| 32. Phaeoisariopsis vitis | 5 |
| 33. Alternaria kikuchiana | 350 |
| 34. Venturia pirina | 100 |
| 35. Gloeosporium laeticolar | 10 |
| 36. Gloeosporium kaki | 75 |
| 37. Fusicladium levieri | 7.5 |
| 38. Pestalotia diospyri | 500 |
| 39. Elsinoe fawcettii | 10 |
| 40. Diaporthe citri | 20 |
| 41. Bacillus subtilis | 35 |
| 42. Bacillus cereus | 50 |
| 43. Staphylococcus aureus | 350 |
| 44. Sarcina lutea | 50 |
| 45. Micrococcus flavus | 150 |
| 46. Mycobacterium ATCC 607 | 100 |
| 47. Mycobacterium avium | 100 |
| 48. Mycobacterium avium (S.M. fast) | 100 |
| 49. Escherichia coli | 500 |
| 50. Proteus vulgaris | 500 |
| 51. Serratia marcescens | 500 |
| 52. Pseudomonas tabaci | 75 |
| 53. Xanthomonas oryzae | 5 |
| 54. Xanthomonas pruni | 5 |
| 55. Xanthomonas citri | 5 |

The other compounds of Tables 1 and 2 have a similar antifungal activity with respect to a wide variety of fungus. This is shown, by way of illustration, with respect to additional typical compounds and representative organisms in Table 4, setting forth the antifungal spectra of these compounds. The latter are identified by the numbers employed in Tables 1 and 2, and the organisms by the numbers employed in Table 3. The method employed was the same as that used in obtaining the antifungal spectrum of zinc dithiocarbonate. The figures represent the minimum inhibitory concentration (γ/ml.).

TABLE 4

| Compound | Organism | | | | | | |
|---|---|---|---|---|---|---|---|
|  | 13 | 14 | 21 | 22 | 25 | 31 | 33 |
| 52 | 10 | 350 | 7.5 | 50 | 35 | 50 | 15 |
| 1 | 15 | >500 | 10 | 500 | 20 | >500 | 500 |
| 53 | 32.5 | 325 | 23 | 32.5 | 23 | 65 | 97 |
| 54 | 20 | 350 | 10 | 20 | 75 | 75 | 75 |
| 5 | 20 | 50 | 50 | >500 | 350 | 200 | 200 |
| 6 | 0.06 | 0.52 | 0.1 | 0.19 | 0.06 | 0.52 | 0.52 |
| 8 | 10 | >500 | 15 | >500 | 200 | 350 | 15 |
| 10 | 20 | >500 | 35 | >500 | >500 | 350 | 35 |
| 12 | 50 | >500 | 50 | >500 | 150 | 200 | 75 |
| 16 | 20 | >500 | 20 | >500 | 350 | 350 | 75 |
| 21 | 50 | 200 | 200 | 200 | 75 | 500 | 75 |
| 23 | 10 | | 10 | 50 | 35 | 100 | 35 |
| 25 | 50 | >500 | 350 | >500 | 35 | 200 | 500 |
| 26 | 20 | 500 | 20 | 200 | 50 | 50 | 200 |
| 27 | 50 | 500 | 10 | 500 | 50 | 35 | 500 |
| 29 | 10 | 10 | 10 | 100 | 150 | 75 | 15 |
| 39 | 15 | >500 | 15 | 350 | 10 | 75 | 75 |
| 40 | 35 | 500 | 35 | >500 | 50 | 200 | 200 |
| 41 | 15 | 15 | >5 | <5 | <5 | <5 | <5 |
| 43 | 20 | 500 | 20 | 100 | 20 | 7.5 | 15 |
| 44 | 50 | >500 | 150 | 500 | 200 | >500 | 500 |
| 57 | 7.5 | 500 | 75 | 75 | 5 | 5 | 7.5 |
| 45 | 20 | >500 | 10 | 150 | 35 | 150 | 35 |
| 47 | 100 | >500 | 500 | 500 | 20 | 50 | 500 |
| 50 | 50 | >500 | 20 | >500 | 20 | 75 | >500 |
| 51 | 20 | 100 | 20 | 50 | <5 | 50 | 20 |

In practice, and for maximum effectiveness, the fungicidal compositions of the present invention are applied to the plants to be fungicidally protected or to be treated against spread of fungus disease, in the form of dust, emulsion, suspension or aqueous solution. In other words, the fungicidal compositions of the invention comprise essentially at least one active compound I and a suitable diluent (or extender and/or conditioning agent) of the type commonly referred to, in connection with the application of agricultural chemicals generally, as a pest control adjuvant. It is not intended, in this respect, that the present invention be limited to any specific proportions of active ingredient(s) I and adjuvant. The compositions may be ready-prepared ab initio or may e.g. be in the form of concentrates comprising active ingredient I with adjuvant, e.g. surface active agent, with only a minor amount of the latter present. Such a concentrate is economical as regards transportation, storage and the like, and may easily be admixed—prior to use—with additional adjuvant to give the desired eventual concentration of active ingredient. It is sufficient that a fungotoxic quantity of active agent I be applied to the plants or parts thereof to be protected or treated, and that the adjuvant be selected on the basis of plant being treated, properties of active ingredient and adjuvant, and the conditions of use.

Thus, if both the active agent and adjuvant(s) are water-soluble, the composition may be applied in the form of an aqueous spray. If, for example, a water-insoluble adjuvant is employed—e.g. if the composition comprises a water-insoluble fungicidal ingredient—the composition may be applied as an aqueous dispersion. It is also possible e.g. merely to mix the active agent, in powder form, with a powdered adjuvant, and to use the mixture (dust) as such; or a mixture of pellets may be used. Or the powder mixture may be suspended in water or in an oil which, upon mixing with water, forms e.g. an oil-in-water emulsion containing the active ingredient.

When the new compositions are used in dust form, the adjuvant (or diluent) may e.g. be talc, clay (such as fuller's earth, attapulgite, etc.), diatomaceous earth, lime, calcium sulfate, kaolin and the like. When the compositions are used in the form of liquid, the adjuvant (diluent) is e.g. water, an aqueous solvent, a volatile or non-volatile organic solvent, and oil, etc., the compound—as aforeindicated—taking the form of a solution, emulsion or suspension depending on the nature of the particular materials employed.

The new fungicidal compositions may contain surface active agents such as wetting and dispersing agents and an emulsifier. They may also contain adherent or sticking agents, and also other pesticides, fungicides, manure or other fertilizer, growth controlling agents, etc., all these additions being considered "adjuvants."

In preparing a fungicidally active aqueous suspension, it is advantageous to include a surface active agent in sufficient amount to disperse and suspend the fungicidal agent I. Examples of such surface active agents are the polyoxyethylene alkylarylethers, such as Triton X-100 (isooctyl phenol etherified with 10 to 11 mols of ethylene oxide), as well as other "Tritons" (higher molecular weight alkyl phenol polyglycol ethers, e.g. dimeric alkyl phenol polyglycol ethers, the higher molecular weight akyl radical containing from 8 to 18 carbon atoms); also salts of the alkyl and alkylaryl sulfonates such as Du Pont MP-189 and Nacconol NR, a sodium salt; alkyl sulfates such as Dreft; alkylamide sulfonates, including fatty methyl taurides, such as Igepon T; the fatty acid esters of polyhydric alcohols, such as Span; the ethylene oxide addition products of such esters, as for example Tween, a hexitol product; etc.

It is within the scope and ambit of the present invention to employ other adjuvants than those hereinbefore mentioned—whether as solid diluents, liquid diluents, emulsifiers and/or dispersants, surface active agents or otherwise—those already mentioned being merely illustrative. The essence of the invention does not reside in any specific adjuvant but in a composition consisting essentially of at least one compound I and an appropriate and generally, but not necessarily, inert agricultural adjuvant, and in protecting plant life against fungus diseases or the spread of the latter, by applying to the plants or to portions thereof, such a composition in any suitable or appropriate manner (e.g. by dusting, spraying, etc.) and in a fungicidally effective amount. The proportions of materials employed in the compositions may vary considerably, as has already been explained. Generally speaking, a fungicidally effective amount is satisfied by the following quantitative relationships:

Dust compositions for direct application to vegetation may contain from 0.5 percent to 10% or more of the active ingredient(s) I by weight. When the composition is designed as a concentrate for the preparation of sprays or more dilute dusts, the content of active ingredient(s) I may vary from about 10% to as high as 50% by weight, the balance of the composition being one of the diluents and/or surface active agents (adjuvants) previously enumerated. Liquid dispersions of the fungotoxicant in water may similarly vary from a very low percentage of active ingredient, e.g. 0.2 to 15% by weight, where the dispersion is to be applied directly to the vegetation, to a relatively high percentage, e.g. 10 to 50% by weight, where the dispersion is to be employed as a concentrate, the balance in each case being constituted by adjuvants.

Organic solvents, useful in compositions according to the invention, include for example non-phytotoxic solvents such as benzene, toluene, xylene and other petroleum distillate fractions or mixtures thereof, as well as the Carbitols and Cellosolves, etc.

Following are a number of examples of presently preferred embodiments of the invention. Percentages are by weight. In those examples, "white carbon" means silicic acid.

Example 1

A mixture consisting of 10% of zinc dithiocarbazate and 90% of talc is finely comminuted in a ball mill.

The resultant mixture may be applied as such to a plant to be protected—e.g. to protect a hybrid tea rose plant against black spot. The plant is thoroughly coated with the dust, taking care that all sides of all leaves are covered.

Example 2

A mixture consisting of 10% of zinc dithiocarbazate and 90% of talc is finely ground in a ball mill as in Example 1. The resultant mixture is then diluted 300-fold, using additional talc as diluent.

Application of the thus-obtained composition by dusting onto cucumber plants ("S$_u$Y$_o$" variety), which plants are highly susceptible to cucumber anthracnose, are substantially completely protected against this disease, even if purposely exposed to a spore suspension of the causal organism (Colletrotrichum lagenarium Ell. et Halst.) and exposed to a moist atmosphere for as long as 48 hours. In sharp contrast, an unprotected plant thus exposed exhibits as many as 279 infected spots on ten observed leaves.

Example 3

The procedure according to Example 2 is repeated with the exception that the 10% of zinc dithiocarbazate is replaced by 10% of (a) manganese dithiocarbazate.
(b) ammonium dithiocarbazate.
(c) zinc 3-phenyldithiocarbazate.
(d) ammonium 3-phenyldithiocarbazate.
(e) methylarsine 3-phenyldithiocarbazate.

In each case, dilution with talc is effected as in Example 2.

Each of the thus-prepared fungicidal compositions affords excellent protection against anthracnose to cucumber plants dusted therewith, even when the plants are exposed to the causal organism mentioned in Example 2.

Example 4

A mixture consisting of 15% of zinc dithiocarbazate, 2% of sodium ligninsulfonate, 2% of white carbon, 4% of Triton X–100 (polyoxyethylene alkylarylether), and 77% of fuller's earth is powdered after the manner described in Example 1.

The product is an effective agricultural fungicidal composition which can be used as such or as a concentrate (which is dilutable with water). It can be used as a protection for e.g. iris against soft rot.

Example 5

A mixture consisting of 65% of zinc dithiocarbazate, 30% of sodium dinaphthylmethanedisulfonate and 5% of zinc oxide is powdered after the manner described in Example 1.

The product is useful as a water-dilutable fungicidal concentrate; the composition may be used in preventing leaf spot on grass (e.g. Kentucky blue grass).

Example 6

A mixture consisting of 65% of zinc dithiocarbazate, 2% of sodium ligninsulfonate, 1% of white carbon, 2.5% of kieselguhr is powdered after the manner of Example 1. The product may be used, after dilution with water, as an effective fungicide for application to fruit trees, e.g. to pear trees.

Example 7

Pear trees (Nijusseiki variety) are sprayed with an aqueous suspension of the fungicidal mixture prepared according to Example 6. Black spot infected leaves are all removed beforehand. Spraying is carried out four times at intervals of one week. The leaves of the thus-treated trees are perfectly protected against black spot whereas an untreated control tree (same fruit, same variety) undergoes a 100% rate of increase of infected leaves.

Example 8

Tomato plants ("Ponterosa" variety) are sprayed with a suspension of the composition according to Example 6, after a 400-fold dilution with water. Spraying is carried out four times at intervals of one week. Good protection against late blight is thus realized, the number of infected areas in the treated plants being less than half the number on an untreated control plant. Moreover, the rate of harvest in the control is taken as 100%.

Example 9

Potato plants ("Danshaku" variety) are protected against late blight of potato by spraying at intervals of about one week with a suspension of the composition employed against late blight of tomato in Example 8.

While zinc dithiocarbazate is used as the preferred active ingredient I in most of the foregoing examples, it will be understood that any other active compound I may be used with like results in similarly-formulated compositions.

Having thus disclosed the invention, what is claimed is:

1. A fungicidal composition for agricultural use, which contains a fungicidal amount of zinc dithiocarbazate and a fungicide adjuvant.

References Cited

UNITED STATES PATENTS

| | | | |
|---|---|---|---|
| 2,149,858 | 3/1939 | Miserentina | 260—500 |
| 2,729,645 | 1/1956 | Klopping | 260—500 |
| 2,844,623 | 7/1958 | Fike | 260—500 |
| 2,920,994 | 1/1960 | Epperly | 167—30 |
| 2,988,475 | 6/1961 | Gaertner | 167—30 |
| 2,673,159 | 3/1954 | Beaver | 167—22 |
| 2,814,582 | 11/1957 | Hackmann | 167—22 |
| 2,729,644 | 6/1956 | Klopping | 167—30 |
| 2,874,086 | 2/1959 | Kruckenberg | 167—30 |
| 2,914,547 | 11/1959 | Gaertner. | |

OTHER REFERENCES

King, U.S. Dept. Agr. Handbook No. 69, 1954, p. 109.
Chem. Abst. 51, p. 8782h (1957).

ALBERT T. MEYERS, Primary Examiner

S. J. FRIEDMAN, Assistant Examiner